US012752666B2

(12) United States Patent
Lian et al.

(10) Patent No.: US 12,752,666 B2
(45) Date of Patent: Oct. 6, 2026

(54) INTEGRATED THERMAL MANAGEMENT SYSTEM AND VEHICLE

(71) Applicant: BYD COMPANY LIMITED, Shenzhen (CN)

(72) Inventors: Yubo Lian, Shenzhen (CN); Heping Ling, Shenzhen (CN); Gan Song, Shenzhen (CN); Lei Yan, Shenzhen (CN); Yong Xiong, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 148 days.

(21) Appl. No.: 18/782,925

(22) Filed: Jul. 24, 2024

(65) Prior Publication Data

US 2024/0375547 A1 Nov. 14, 2024

Related U.S. Application Data

(63) Continuation of application No. PCT/CN2023/075567, filed on Feb. 13, 2023.

(30) Foreign Application Priority Data

Mar. 31, 2022 (CN) ........................ 202210345378.X

(51) Int. Cl.
*B60L 58/25* (2019.01)
*B60H 1/00* (2006.01)
(Continued)

(52) U.S. Cl.
CPC .......... *B60L 58/25* (2019.02); *B60H 1/00278* (2013.01); *B60H 1/0073* (2019.05); (Continued)

(58) Field of Classification Search
CPC .............. B60H 1/00278; B60H 1/0073; B60H 1/3213; B60L 58/25; B60L 58/26; (Continued)

(56) References Cited

U.S. PATENT DOCUMENTS 4,345,442 A * 8/1982 Dorman ................. H02K 33/18 417/418
4,441,901 A * 4/1984 Endoh ..................... F25B 30/06 62/238.7

(Continued)

FOREIGN PATENT DOCUMENTS

CN 101008535 A 8/2007
CN 105762434 A 7/2016

(Continued)

OTHER PUBLICATIONS

The World Intellectual Property Organization (WIPO) International Search Report for PCT/CN2023/075567 May 29, 2023 6 Pages (including translation).

*Primary Examiner* — Marc E Norman
(74) *Attorney, Agent, or Firm* — Wenye Tan

(57) ABSTRACT

An integrated heat management system includes: a heat pump subsystem, configured to exchange heat with a passenger compartment and a battery of a vehicle; a high-pressure cooling subsystem, configured to exchange heat with a high-pressure system of the vehicle and the heat pump subsystem; a battery self-heating subsystem, configured to heat the battery through charging and discharging; an air heating subsystem, configured to exchange heat with the passenger compartment; the heat pump subsystem including a compressor and a control valve, one end of the control valve being in communication with an exhaust port of the compressor, and an other end of the control valve being in communication with an air return port of the compressor directly or through a gas-liquid separator; and a control subsystem, configured to control the control valve to be in communication with the exhaust port and the air return port of the compressor.

12 Claims, 6 Drawing Sheets

(51) Int. Cl.

| | |
|---|---|
| ***B60H 1/32*** | (2006.01) |
| ***B60L 58/26*** | (2019.01) |
| ***B60L 58/27*** | (2019.01) |
| ***H01M 10/613*** | (2014.01) |
| ***H01M 10/615*** | (2014.01) |
| ***H01M 10/625*** | (2014.01) |
| ***H01M 10/633*** | (2014.01) |
| ***H01M 10/657*** | (2014.01) |
| ***H01M 10/663*** | (2014.01) |
| ***H02M 7/5387*** | (2007.01) |
| *H02P 27/00* | (2006.01) |

(52) U.S. Cl.

CPC ............ *B60H 1/3213* (2013.01); *B60L 58/26* (2019.02); *B60L 58/27* (2019.02); *H01M 10/613* (2015.04); *H01M 10/615* (2015.04); *H01M 10/625* (2015.04); *H01M 10/633* (2015.04); *H01M 10/657* (2015.04); *H01M 10/663* (2015.04); *H02M 7/53871* (2013.01); *B60H 2001/00307* (2013.01); *H01M 2220/20* (2013.01); *H02P 27/00* (2013.01)

(58) Field of Classification Search

CPC ... B60L 58/27; H01M 10/613; H01M 10/615; H01M 10/625; H01M 10/633; H01M 10/657; H01M 10/663; H01M 7/53871; H02M 7/53871

USPC .......................................................... 62/196.3

See application file for complete search history.

(56) References Cited

U.S. PATENT DOCUMENTS

| | | | | |
|---|---|---|---|---|
| 2010/0045105 | A1 | 2/2010 | Bovio et al. | |
| 2016/0361974 | A1 | 12/2016 | Porras et al. | |
| 2020/0101810 | A1 | 4/2020 | Takagi et al. | |
| 2020/0353795 | A1 | 11/2020 | Choi et al. | |
| 2023/0373264 | A1* | 11/2023 | Lian | B60L 58/26 |
| 2024/0017589 | A1* | 1/2024 | Lian | B60L 3/0061 |
| 2024/0079984 | A1* | 3/2024 | Huang | B60L 58/27 |

FOREIGN PATENT DOCUMENTS

| | | | | | |
|---|---|---|---|---|---|
| CN | 206141270 | U | | 5/2017 | |
| CN | 206269278 | U | | 6/2017 | |
| CN | 109941065 | A | | 6/2019 | |
| CN | 110588277 | A | | 12/2019 | |
| CN | 111038212 | A | | 4/2020 | |
| CN | 112706577 | A | * | 4/2021 | B60L 58/26 |
| CN | 112706578 | A | | 4/2021 | |
| CN | 112977002 | A | | 6/2021 | |
| CN | 213920594 | U | | 8/2021 | |
| CN | 113858910 | A | | 12/2021 | |
| KR | 20190142008 | A | | 12/2019 | |
| WO | 2021057339 | A1 | | 4/2021 | |
| WO | 2022021450 | A1 | | 2/2022 | |

* cited by examiner

INTEGRATED THERMAL MANAGEMENT SYSTEM AND VEHICLE

CROSS-REFERENCE TO RELATED APPLICATIONS

The present application is a continuation application of PCT application No. PCT/CN2023/075567, filed on Feb. 13, 2023, which claims priority to Chinese Patent Application No. 202210345378.X, entitled "INTEGRATED HEAT MANAGEMENT SYSTEM AND VEHICLE" filed on Mar. 31, 2022, content of all of which is incorporated herein by reference in its entirety.

FIELD

The present disclosure relates to an integrated heat management system and a vehicle.

BACKGROUND

In a current vehicle heat management system, it is difficult to meet a heat requirement when a passenger compartment and a battery of a vehicle are heated, and heat distribution between the passenger compartment and the battery of the vehicle is not proper enough. Therefore, problems such as insufficient heat distribution and low heating efficiency are prone to occur.

In addition, when the vehicle performs heating by using a heat pump system, in a case in which a temperature is low or an air return pressure of a compressor is insufficient, a flow rate of a refrigerant that flows into the compressor is insufficient, which easily leads to a low suction pressure and less work of the compressor. This reduces a heating capacity of the heat pump system, and greatly reduces energy utilization efficiency of the vehicle.

SUMMARY

The present disclosure is intended to resolve at least one of the technical problems in the related art to some extent.

To this end, a first objective of the present disclosure is to propose an integrated heat management system. The system may not only meet a heat requirement of a passenger compartment and a battery, but also implement proper distribution of heat between the passenger compartment and the battery, and by performing air supplement and enthalpy increase on a compressor, may further improve a heating capacity of a heat pump subsystem, thereby improving energy utilization efficiency of a vehicle.

A second objective of the present disclosure is to propose a vehicle.

To achieve the foregoing objective, an embodiment of a first aspect of the present disclosure proposes an integrated heat management system. The system includes: a heat pump subsystem, configured to heat or cool a passenger compartment of a vehicle, and configured to exchange heat with a battery of the vehicle; a high-pressure cooling subsystem, configured to exchange heat with a high-pressure system of the vehicle and the heat pump subsystem; a battery self-heating subsystem, configured to heat the battery through charging and discharging of the battery; an air heating subsystem, configured to heat the passenger compartment; the heat pump subsystem including a compressor and a control valve, one end of the control valve being in communication with an exhaust port of the compressor, and another end of the control valve being in communication with an air return port of the compressor or being in communication with an air return port of the compressor through a gas-liquid separator; and a control subsystem, configured to control the control valve to be in communication with the exhaust port of the compressor and the air return port of the compressor, to implement air supplement and enthalpy increase.

According to the integrated heat management system in the embodiment of the present disclosure, the heat pump subsystem exchanges heat with the passenger compartment and the battery of the vehicle, the high-pressure cooling subsystem exchanges heat with the high-pressure system of the vehicle and the heat pump subsystem, the battery self-heating subsystem heats the battery through charging and discharging, the air heating subsystem exchanges heat with the passenger compartment, and the control subsystem controls the control valve in the heat pump subsystem to be in communication with the exhaust port of the compressor and the air return port of the compressor, to implement air supplement and enthalpy increase on the compressor. Therefore, the system may not only meet the heat requirement of the passenger compartment and the battery, but also implement proper distribution of heat between the passenger compartment and the battery, and by performing air supplement and enthalpy increase on the compressor, may further improve a heating capacity of the heat pump subsystem, thereby improving energy utilization efficiency of the vehicle.

To achieve the foregoing objective, an embodiment of a second aspect of the present disclosure proposes a vehicle, including the integrated heat management system in the embodiment of the first aspect.

According to the vehicle in the embodiment of the present disclosure, the foregoing integrated heat management system may not only meet the heat requirement of the passenger compartment and the battery, but also implement proper distribution of heat between the passenger compartment and the battery, and by performing air supplement and enthalpy increase on the compressor, may further improve a heating capacity of the heat pump subsystem, thereby improving energy utilization efficiency of the vehicle.

Other aspects and advantages of the present disclosure will become apparent from the following description or may be learned from practices of the present disclosure.

DETAILED DESCRIPTION

Embodiments of the present disclosure are described below in detail, together with the accompanying drawings, and same or similar reference signs in the accompanying drawings may indicate same or similar components or components having same or similar functions. The embodiments described below with reference to the accompanying drawings are examples, and are intended to explain the present disclosure and cannot be construed as a limitation to the present disclosure.

An integrated heat management system and a vehicle proposed in embodiments of the present disclosure are described below with reference to the accompanying drawings.

Figure 1:
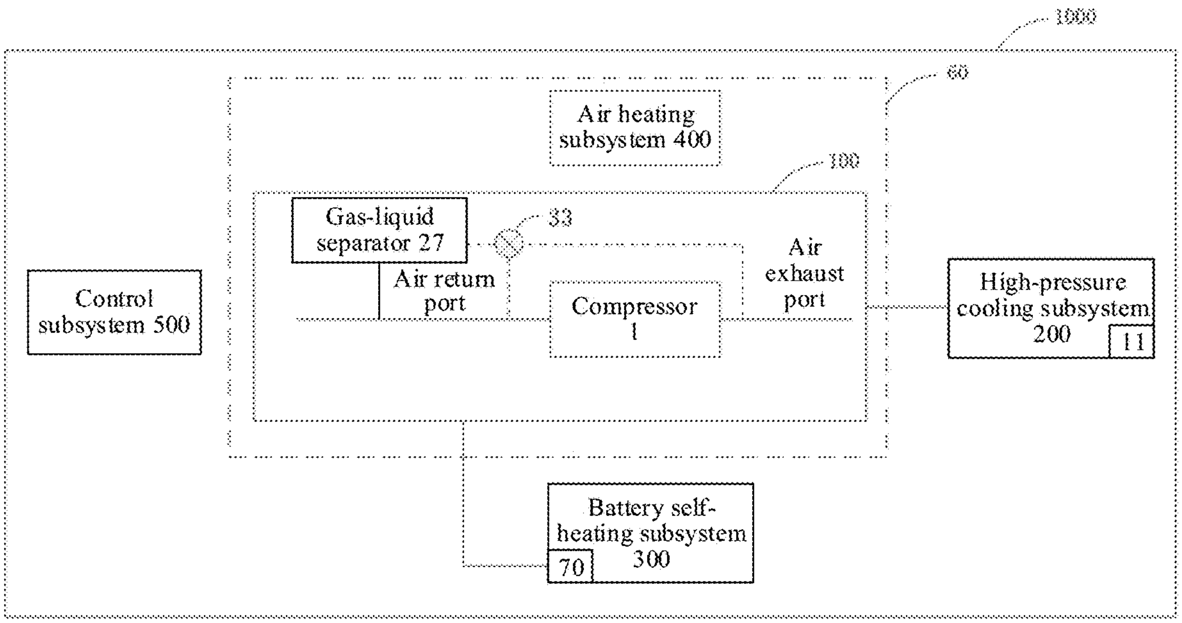
FIG. 1 is a schematic diagram of a structure of an integrated heat management system according to an embodiment of the present disclosure.

FIG. 1 is a schematic diagram of a structure of an integrated heat management system according to an embodiment of the present disclosure. Referring to FIG. 1, the system 1000 includes: a heat pump subsystem 100, a high-pressure cooling subsystem 200, a battery self-heating subsystem 300, an air heating subsystem 400, and a control subsystem 500.

The heat pump subsystem 100 is configured to exchange heat with a passenger compartment 60 and a battery 70 of a vehicle. The high-pressure cooling subsystem 200 is configured to exchange heat with a high-pressure system 11 of the vehicle and the heat pump subsystem 100. The battery self-heating subsystem 300 is configured to heat the battery 70 through charging and discharging. The air heating subsystem 400 is configured to exchange heat with the passenger compartment 60. The heat pump subsystem 100 includes a compressor 1 and a control valve 33, one end of the control valve 33 is in communication with an exhaust port of the compressor 1, an other end of the control valve 33 is in communication with an air return port of the compressor 1, or an other end of the control valve 33 is in communication with an air return port of the compressor 1 through a gas-liquid separator 27. The control subsystem 500 is configured to control the control valve 33 to be in communication with the exhaust port of the compressor 1 and the air return port of the compressor, to implement air supplement and enthalpy increase.

Specifically, as shown in FIG. 1, when the passenger compartment 60 has a heating requirement, the passenger compartment 60 may be heated by controlling the heat pump subsystem 100 or the air heating subsystem 400. The high-pressure cooling subsystem 200 is configured to exchange heat with the high-pressure system 11 and the heat pump subsystem 100. In the heat exchanging process, the high-pressure cooling subsystem 200 may transfer the generated heat to the heat pump subsystem 100, thereby implementing heat replenishment on the heat pump subsystem 100. In other words, heating of the passenger compartment 60 may be implemented through the heat pump subsystem 100 in collaboration with the high-pressure cooling subsystem 200. Further, heating of the passenger compartment 60 may also be implemented through the heat pump subsystem 100 in collaboration with the air heating subsystem 400. Heating of the passenger compartment 60 may be further implemented through the heat pump subsystem 100 in collaboration with the high-pressure cooling subsystem 200 and the air heating subsystem 400. When the battery 70 has a heating requirement, the battery 70 may be heated by controlling the heat pump subsystem 100 or the battery self-heating subsystem 300. Similarly, as described above, heating of the battery 70 may also be implemented through the heat pump subsystem 100 in collaboration with the high-pressure cooling subsystem 200. Further, heating of the battery 70 may also be implemented through the heat pump subsystem 100 in collaboration with the battery self-heating subsystem 300. Heating of the battery 70 may be further implemented through the heat pump subsystem 100 in collaboration with the high-pressure cooling subsystem 200 and the battery self-heating subsystem 300. In other words, during actual use, according to the heating requirement of the passenger compartment and the battery, collaboration of each subsystem and different subsystems may be properly used to implement heating of the passenger compartment and the battery. In this way, the heat requirement of the passenger compartment and the battery may be met, and proper distribution of heat may be implemented, to avoid insufficient heat distribution, thereby improving energy utilization efficiency of the vehicle.

Further, an air supplement and enthalpy increase structure is further arranged on the integrated heat management system 1000. In other words, when a flow rate of a refrigerant suctioned by the compressor 1 is insufficient and as a result, a heating capacity of the heat pump subsystem 100 is reduced, air supplement and enthalpy increase may be further performed on the air return port of the compressor 1 by increasing the flow rate of the refrigerant, to improve the heating capacity of the heat pump subsystem 100. Specifically, a control valve 33 is arranged inside the heat pump subsystem 100. As shown in FIG. 1, the exhaust port of the compressor 1 may be controlled, through the control subsystem 500, to be directly in communication with the air return port of the compressor, and the refrigerant diverted from the exhaust port of compressor 1 is re-input into compressor 1, to implement air supplement and enthalpy increase on the compressor 1, thereby increasing the flow rate of the refrigerant of the compressor 1. Alternatively, the exhaust port of the compressor 1 may also be controlled to be in communication with the gas-liquid separator 27 through the control subsystem 500, and the refrigerant diverted from the exhaust port of the compressor 1 is re-input into the compressor 1 through the gas-liquid separator 27, thereby also implementing air supplement and enthalpy increase on the compressor 1. Therefore, by performing air supplement and enthalpy increase on the compressor, the flow rate of the refrigerant flowing into the compressor is increased, thereby increasing the heating capacity of the heat pump subsystem, and further improving the energy utilization efficiency of the vehicle.

In this embodiment, the control valve 33 may be a throttle control valve, an opening degree of the control valve 33 is adjustable, and the control valve 33 may also be disconnected.

Figure 2:
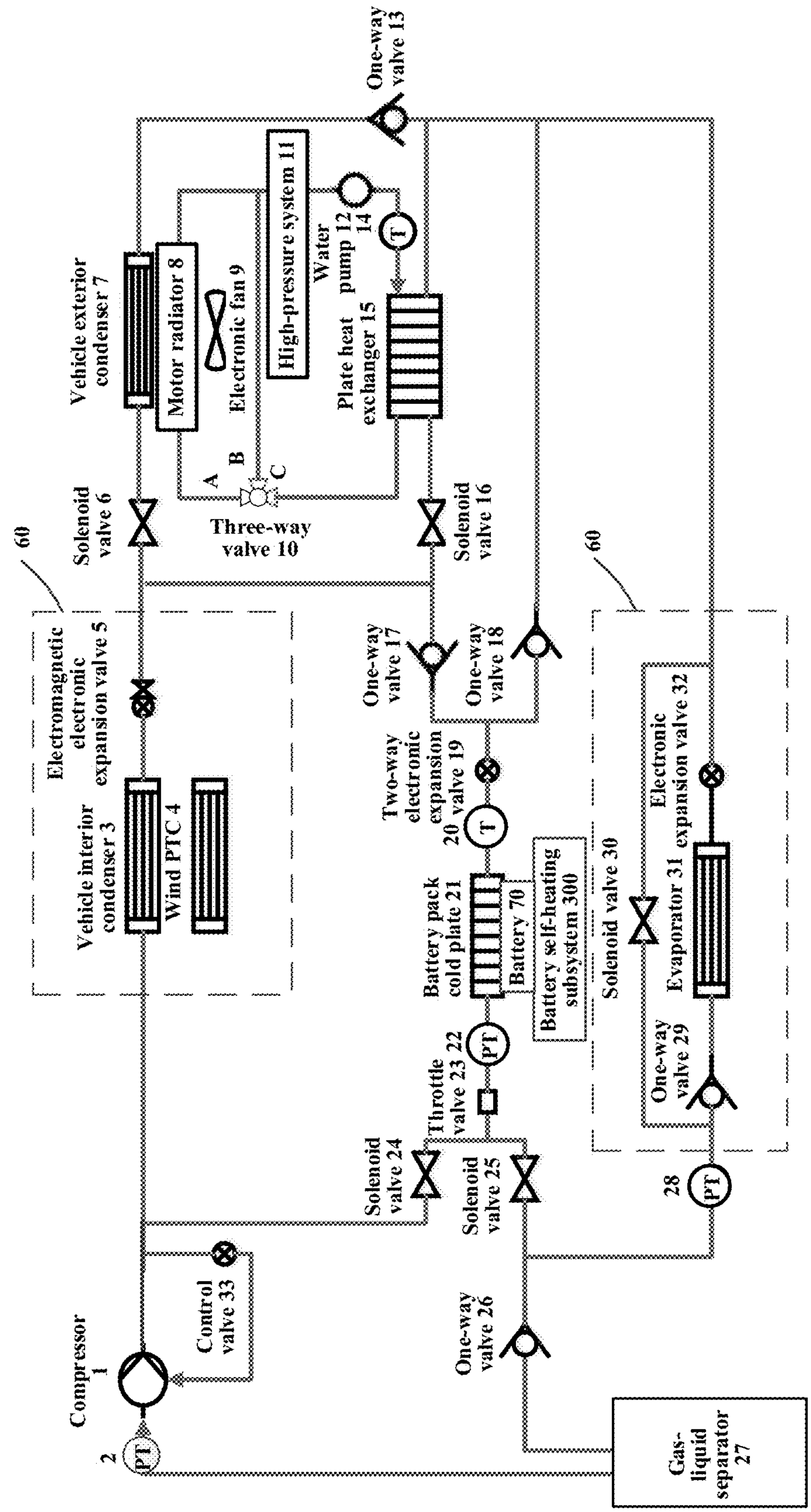
FIG. 2 is a schematic diagram of a structure of an integrated heat management system according to an embodiment of the present disclosure.
Figure 3:
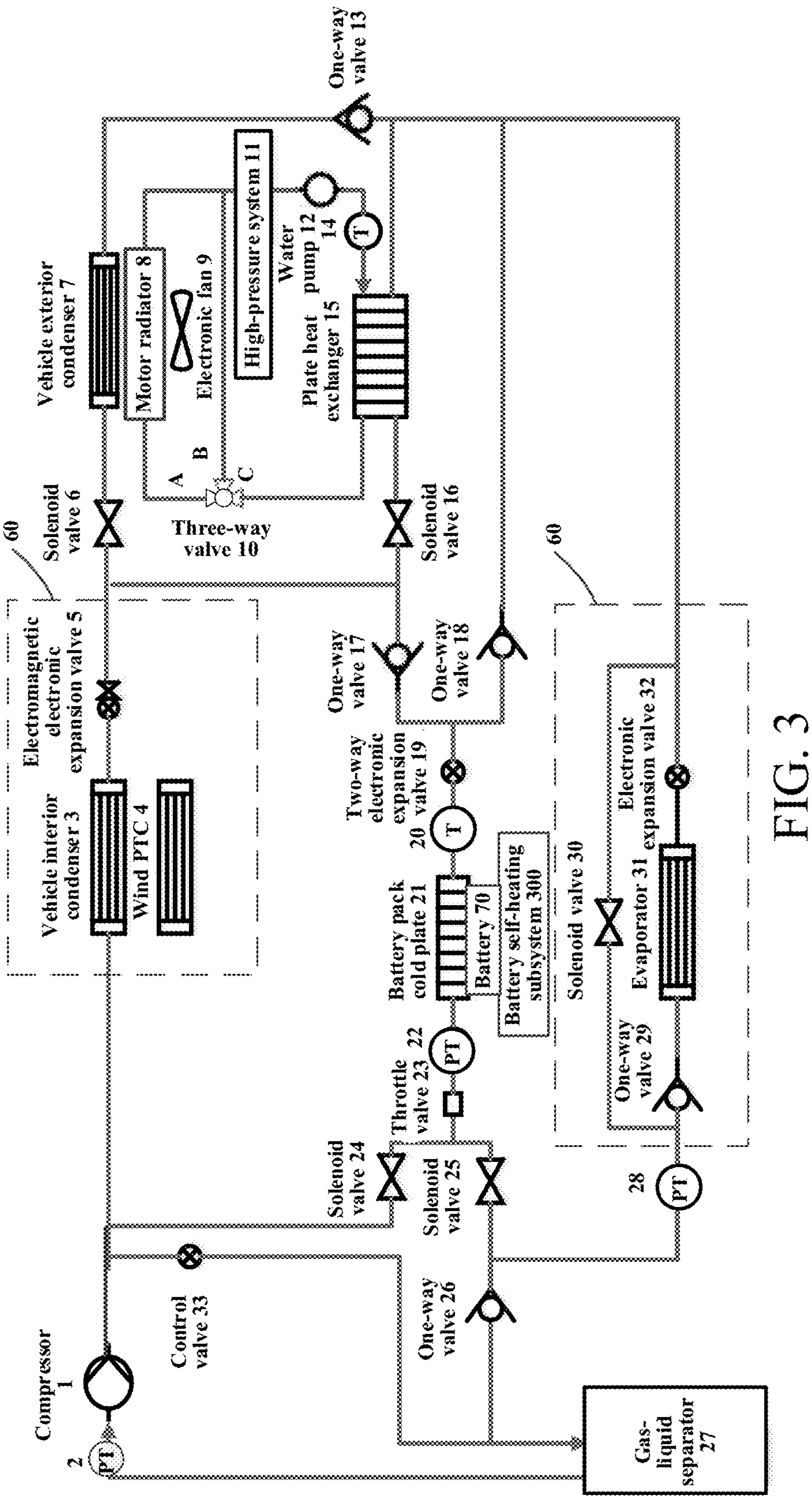
FIG. 3 is a schematic diagram of a structure of an integrated heat management system according to an embodiment of the present disclosure.

For example, as shown in FIG. 2 and FIG. 3, it is assumed that a heat pump subsystem includes a compressor 1, a temperature and pressure sensor 2, a vehicle interior condenser 3, an electromagnetic electronic expansion valve 5, a solenoid valve 6, a vehicle exterior condenser 7, a one-way valve 13, a plate heat exchanger 15, a solenoid valve 16, a one-way valve 17/18, a two-way electronic expansion valve 19, a refrigerant temperature sensor 20, a battery pack cold plate 21, a refrigerant temperature and pressure sensor 22, a throttle valve 23, a solenoid valve 24/25, a one-way valve 26, a gas-liquid separator 27, a refrigerant temperature and pressure sensor 28, a one-way valve 29, a solenoid valve 30, an evaporator 31, an electronic expansion valve 32, and a control valve 33; a high-pressure cooling subsystem includes a motor radiator 8, an electronic fan 9, a three-way valve 10, a high-pressure system 11, a water pump 12, and a water temperature sensor 14; an air heating subsystem is wind PTC 4; and a battery self-heating subsystem 300 directly heats a battery 70.

When a passenger compartment 60 has a heating requirement, the compressor 1 is controlled to work and drive a refrigerant to flow into the vehicle interior condenser 3. The refrigerant condenses and releases heat in the vehicle interior condenser 3, to increase a temperature of the passenger compartment 60. When the solenoid valve 6 is controlled to open, and the solenoid valve 16 is controlled to close, the refrigerant flows into the vehicle exterior condenser 7, absorbs heat and evaporates in the vehicle exterior condenser 7, and then returns to the compressor 1 through the solenoid valve 30 and the gas-liquid separator 27, to form a first heat exchange and heating circuit for the passenger compartment 60. Alternatively, when the solenoid valve 16 is controlled to open, and the solenoid valve 6 is controlled to close, the refrigerant flows into the plate heat exchanger 15, absorbs heat and evaporates in the plate heat exchanger 15, and then returns to the compressor 1 through the solenoid valve 30 and the gas-liquid separator 27, to form a second heat exchange and heating circuit for the passenger compartment 60. Further, in an operation process of the vehicle, the high-pressure system 11 generates heat. By driving a water pump 12 in the high-pressure cooling subsystem, a high-temperature coolant flowing out after cooling the high-pressure system 11 may be transferred to the plate heat exchanger 15. In this way, the high-temperature coolant may be cooled down, and heat replenishment may be performed on the heat pump subsystem 100, thereby improving the energy utilization efficiency of the vehicle. Heat emitted by the high-pressure system 11 may be waste heat or heat generated by active control. In addition, air may be further directly heated by the wind PTC 4, and the heated air may be blown directly to the passenger compartment 60 to heat the passenger compartment 60. It should be noted that, heating performed on the passenger compartment through collaboration of each system is as described above. This is not described herein again.

When the battery 70 has a heating requirement, the battery 70 may be directly heated through the battery self-heating subsystem 300, to implement rapid heating of the battery 70. The heat pump subsystem 100 may be further controlled to heat the battery 70. The compressor 1 works and drives the refrigerant to flow into the battery pack cold plate 21 through the solenoid valve 24 and the throttle valve 23. After the refrigerant in the battery pack cold plate 21 condenses, the battery 70 is heated. When the solenoid valve 6 is controlled to open, and the solenoid valve 16 is controlled to close, the refrigerant flows into the vehicle exterior condenser 7, absorbs heat and evaporates in the vehicle exterior condenser 7, and then returns to the compressor 1 through the solenoid valve 30 and the gas-liquid separator 27, to form the first heat pump heating circuit for the battery 70. Alternatively, when the solenoid valve 16 is controlled to open, and the solenoid valve 6 is controlled to close, the refrigerant flows into the plate heat exchanger 15, absorbs heat and evaporates in the plate heat exchanger 15, and then returns to the compressor 1 through the solenoid valve 30 and the gas-liquid separator 27, to form the second heat pump heating circuit for the battery 70. Similarly, the heat generated by the high-pressure system 11 may still be used to perform heat replenishment on the heat pump subsystem 100, to improve energy utilization efficiency. Heating performed on the battery through collaboration of each system is as described above. This is not described herein again. It should be noted that, battery self-heating is internal heating. In comparison to a manner of performing heating through the heat pump subsystem 100, heating efficiency of the battery self-heating is higher, thereby improving the energy utilization efficiency of the vehicle. In addition, in a process of cooling the high-pressure system 11, active heat generated by the motor may be further reduced, so that the motor works in a more efficient range, thereby improving driving efficiency.

Further, when a flow rate of a refrigerant suctioned by the compressor 1 is insufficient and as a result, a heating capacity of the heat pump subsystem 100 is reduced, air supplement and enthalpy increase may be performed on the air return port of the compressor 1 in a manner of increasing the flow rate of the refrigerant, to improve the heating capacity of the heat pump subsystem 100. Specifically, as shown in FIG. 2, when the control subsystem 500 controls the exhaust port of the compressor 1 to be in communication with the air return port of the compressor, after being throttled and decompressed, a part of a high-temperature and high-pressure gaseous refrigerant compressed by the compressor 1 flows back into the air return port of the compressor 1, and is mixed with the gaseous refrigerant at the air return port of the compressor 1, thereby increasing a pressure and a flow rate of the gaseous refrigerant at the air return port of the compressor 1, and increasing the heating capacity of the heat pump subsystem 100. As shown in FIG. 3, when the exhaust port of the compressor 1 is controlled to be in communication with the gas-liquid separator 27 at the air return port, after being throttled and decompressed, a part of the high-temperature and high-pressure gaseous refrigerant flows into the gas-liquid separator 27 through the control valve 33. In this way, a temperature of the separated gaseous refrigerant in the gas-liquid separator 27 is increased, and a liquid refrigerant in the gas-liquid separator 27 may be further heated to change a phase of the liquid refrigerant into the gaseous refrigerant, to increase the flow rate of the gaseous refrigerant flowing into the air return port of the compressor 1, and increase the heating capacity of the heat pump subsystem 100. Therefore, by performing air supplement and enthalpy increase on the compressor, the flow rate of the refrigerant flowing into the compressor is increased, thereby increasing the heating capacity of the heat pump subsystem, and further improving the energy utilization efficiency of the vehicle.

According to the integrated heat management system in the embodiment of the present disclosure, the heat pump subsystem exchanges heat with the passenger compartment and the battery of the vehicle, the high-pressure cooling subsystem exchanges heat with the high-pressure system of the vehicle and the heat pump subsystem, the battery self-heating subsystem heats the battery through charging and discharging, the air heating subsystem exchanges heat with the passenger compartment, and the control subsystem controls the control valve in the heat pump subsystem to be in communication with the exhaust port of the compressor and the air return port of the compressor, to implement air supplement and enthalpy increase on the compressor. Therefore, the system may not only meet the heat requirement of the passenger compartment and the battery, but also implement proper distribution of heat between the passenger compartment and the battery, and by performing air supplement and enthalpy increase on the compressor, may further improve the heating capacity of the heat pump subsystem, thereby improving the energy utilization efficiency of the vehicle.

In some embodiments, when either of the passenger compartment or the battery has a heating requirement, the control subsystem is specifically configured to: obtain a corresponding required heat value, obtain an available heat value and an energy efficiency value of each of the heat pump subsystem, the high-pressure cooling subsystem, the battery self-heating subsystem, and the air heating subsystem, and determine, according to the required heat value, the available heat value, and the energy efficiency value, a subsystem that meets the heating requirement and has the highest energy efficiency to perform heating.

It should be noted that, the required heat value of the passenger compartment is obtained by a current ambient temperature and a required ambient temperature. The required heat value of the battery is obtained according to a temperature at which the battery can work normally and the current ambient temperature. The available heat value of the heat pump subsystem is obtained by a power of the compressor of the heat pump subsystem and an evaporation amount of the refrigerant. The power of the compressor may be obtained by a rotation speed, a voltage, and a current of the compressor, and the evaporation amount of the refrigerant may be obtained by a temperature difference of the refrigerant before and after the refrigerant flows through the vehicle exterior condenser or the plate heat exchanger, that is, obtained by an enthalpy difference of the refrigerant flowing in and out the vehicle exterior condenser or the plate heat exchanger. The available energy efficiency value of the heat pump subsystem is a calibrated value, and a corresponding energy efficiency value is obtained in a manner of looking up a table. The available heat value of the high-pressure cooling subsystem is provided by the motor in the high-pressure system. A heat production value of the motor is obtained by obtaining a working voltage, a current, and a frequency of the motor. In other words, the available heat value of the high-pressure cooling subsystem may be obtained. The available energy efficiency value of the high-pressure cooling subsystem is the energy efficiency value of the motor. Similarly, the energy efficiency value of the motor is calibrated in advance in a manner of an experiment, and a corresponding energy efficiency value is obtained in a manner of looking up a table. The available heat value of the battery heating subsystem is heat that currently the battery heating subsystem can provide in a safe range of use. The available heat value is obtained according to a working current in the battery heating subsystem. Similarly, the energy efficiency value of the battery heating subsystem is calibrated in advance in a manner of an experiment, and a corresponding energy efficiency value is obtained in a manner of looking up a table. The available heat value of the air heating subsystem is heat that currently the air heating subsystem can provide when working normally. The available heat value is obtained according to a working current in the air heating subsystem. Similarly, the energy efficiency value of the air heating subsystem is calibrated in advance in a manner of an experiment, and a corresponding energy efficiency value is obtained in a manner of looking up a table.

Specifically, in a practical working process, if either of the passenger compartment or the battery has a heating requirement, a corresponding required heat value is obtained through the control subsystem, and an available heat value and a corresponding energy efficiency value of each of the heat pump subsystem, the high-pressure cooling subsystem, the battery heating subsystem, and the air heating subsystem are obtained through the control subsystem. The required heat value is compared with the available heat value of each subsystem, and a subsystem that meets the heating requirement and has the highest energy efficiency is selected. The subsystem is used to heat a module that has a heating requirement, so that while meeting the heat requirement of the passenger compartment and the battery, proper distribution of the heat of the vehicle may be implemented, and the energy utilization efficiency of the vehicle is improved.

Optionally, when the passenger compartment has a heating requirement, the control subsystem is specifically configured to determine, according to the available heat value and the energy efficiency value after collaboration of each of the heat pump subsystem, the high-pressure cooling subsystem, and the air heating subsystem and different subsystems, and the required heat value of the passenger compartment, the subsystem that meets the heating requirement of the passenger compartment and has the highest energy efficiency to perform heating.

Specifically, when only the passenger compartment is heated through the control subsystem, the required heat value of the passenger compartment is obtained. It is assumed that the required heat value is A, and the available heat value and the energy efficiency value of each subsystem are obtained through the control subsystem, for example, an available heat value C and an energy efficiency value c of the heat pump subsystem, an available heat value D and an energy efficiency value d of the high-pressure cooling subsystem, and an available heat value F and an energy efficiency value f of the air heating subsystem. Further, an available heat value and an energy efficiency value after collaboration of different subsystems may be obtained. For example, an available heat value of the heat pump subsystem in collaboration with the high-pressure cooling subsystem is C+D and a corresponding energy efficiency value is cd, an available heat value of the heat pump subsystem in collaboration with the air heating subsystem is C+F and a corresponding energy efficiency value cf, and an available heat value of the heat pump subsystem in collaboration with the high-pressure cooling subsystem and the air heating subsystem is C+D+F and a corresponding energy efficiency value is cdf. Available heat values (C, F, C+D, C+F, and C+D+F) of the heat pump subsystem, the air heating subsystem, the heat pump subsystem in collaboration with the high-pressure cooling subsystem, the heat pump subsystem in collaboration with the air heating subsystem, and the heat pump subsystem in collaboration with the high-pressure cooling subsystem and the air heating subsystem are compared with the required heat value (A), and a subsystem that meets the heating requirement and has the highest energy efficiency value is selected to heat the passenger compartment. Therefore, the passenger compartment is heated through collaboration of each subsystem or different subsystems, thereby improving heating efficiency, and improving a driving experience of a user in a cockpit.

Optionally, when the battery has a heating requirement, the control subsystem is specifically configured to determine, according to the available heat value and the energy efficiency value after collaboration of each of the heat pump subsystem, the high-pressure cooling subsystem, and the battery self-heating subsystem and different subsystems, and the required heat value of the battery, the subsystem that meets the heating requirement of the battery and has the highest energy efficiency to perform heating.

Specifically, when only the battery is heated through the control subsystem, it is assumed that the obtained required heat value of the battery is B, and the available heat value and the energy efficiency value of each subsystem are obtained through the control subsystem, for example, an available heat value C and an energy efficiency value c of the heat pump subsystem, an available heat value D and an energy efficiency value d of the high-pressure cooling subsystem, and an available heat value G and an energy efficiency value g of the battery self-heating subsystem. Further, an available heat value and an energy efficiency value after collaboration of different subsystems may be obtained. For example, an available heat value of the heat pump subsystem in collaboration with the high-pressure cooling subsystem is C+D and a corresponding energy efficiency value is cd, an available heat value of the heat pump subsystem in collaboration with the battery self-heating subsystem is C+G and a corresponding energy efficiency value cg, and an available heat value of the heat pump subsystem in collaboration with the high-pressure cooling subsystem and the battery self-heating subsystem is C+D+G and a corresponding energy efficiency value is cdg. Available heat values (C, G, C+D, C+G, and C+D+G) of the heat pump subsystem, the battery self-heating subsystem, the heat pump subsystem in collaboration with the high-pressure cooling subsystem, the heat pump subsystem in collaboration with the battery self-heating subsystem, and the heat pump subsystem in collaboration with the high-pressure cooling subsystem and the battery self-heating subsystem are compared with the required heat value (B), and a subsystem that meets the heating requirement and has the highest energy efficiency value is selected to heat the battery. Therefore, when the battery has a heating requirement, the heat pump subsystem may be used to heat the battery, or the battery self-heating subsystem may be directly used to directly heat the battery, to obtain higher heating efficiency. Different subsystems may be further used in collaboration to heat the battery, thereby increasing a heating rate and a heating amplitude of the battery.

Optionally, the subsystem that meets the heating requirement of the passenger compartment and has the highest energy efficiency is determined according to the available heat value and the energy efficiency value after collaboration of each of the heat pump subsystem, the high-pressure cooling subsystem, and the air heating subsystem and different subsystems, and the required heat value of the passenger compartment. The subsystem that meets the heating requirement of the battery and has the highest energy efficiency is determined according to the available heat value and the energy efficiency value after collaboration of each of the heat pump subsystem, the high-pressure cooling subsystem, and the battery self-heating subsystem and different subsystems, and the required heat value of the battery. When it is determined that the subsystem that meets the heating requirement of the passenger compartment and has the highest energy efficiency is the same as the subsystem that meets the heating requirement of the battery and has the highest energy efficiency, if the subsystem simultaneously meets the heating requirement of the passenger compartment and the heating requirement of the battery, the subsystem is controlled to perform heating, or otherwise the subsystem that meets the heating requirement of the passenger compartment and has the second highest energy efficiency, and/or the subsystem that meets the heating requirement of the battery and has the second highest energy efficiency is determined to perform heating.

Specifically, when the passenger compartment and the battery are simultaneously heated through the control subsystem, it is assumed that the obtained required heat value of the passenger compartment is A and the obtained required heat value of the battery is B, an available heat value and an energy efficiency value of the heat pump subsystem that are obtained through the control subsystem are C and c respectively, an available heat value and an energy efficiency value of the high-pressure cooling subsystem are D and d respectively, an available heat value and an energy efficiency value of the air heating subsystem are F and f respectively, and an available heat value and an energy efficiency value of the battery self-heating subsystem are G and g respectively. Available heat values (C, F, C+D, C+F, and C+D+F) of the heat pump subsystem, the air heating subsystem, the heat pump subsystem in collaboration with the high-pressure cooling subsystem, the heat pump subsystem in collaboration with the air heating subsystem, and the heat pump subsystem in collaboration with the high-pressure cooling subsystem and the air heating subsystem are compared with the required heat value (A) of the passenger compartment, and a subsystem that meets the heating requirement and has the highest energy efficiency value is selected. Available heat values (C, G, C+D, C+G, and C+D+G) of the heat pump subsystem, the battery self-heating subsystem, the heat pump subsystem in collaboration with the high-pressure cooling subsystem, the heat pump subsystem in collaboration with the battery self-heating subsystem, and the heat pump subsystem in collaboration with the high-pressure cooling subsystem and the battery self-heating subsystem are compared with the required heat value (B), and a subsystem that meets the heating requirement and has the highest energy efficiency value is selected.

If the subsystem that meets the heating requirement of the passenger compartment and has the highest energy efficiency is different from the subsystem that meets the heating requirement of the battery and has the highest energy efficiency, respective corresponding subsystems are separately used to heat the passenger compartment and the battery. In other words, the subsystem that meets the heating requirement of the passenger compartment and has the highest energy efficiency is used to heat the passenger compartment, and the subsystem that meets the heating requirement of the battery and has the highest energy efficiency is used to heat the battery.

If the subsystem that meets the heating requirement of the passenger compartment and has the highest energy efficiency is the same as the subsystem that meets the heating requirement of the battery and has the highest energy efficiency, due to possible dispersion of energy when the same subsystem is used to heat the passenger compartment and the battery, it needs to determine whether the subsystem can simultaneously meet the heating requirement of the passenger compartment and the heating requirement of the battery. If the subsystem simultaneously meets the heating requirement of the passenger compartment and the heating requirement of the battery, the subsystem is controlled to perform heating.

If the subsystem cannot simultaneously meet the heating requirement of the passenger compartment and the heating requirement of the battery, a subsystem that meets the heating requirement of the passenger compartment and has second highest energy efficiency may be obtained. A subsystem that meets the heating requirement of the passenger compartment and has the second highest energy efficiency is used to heat the passenger compartment, and a subsystem that meets the heating requirement of the battery and has highest energy efficiency is used to heat the battery. A subsystem that meets the heating requirement of the battery and has the second highest energy efficiency may be further obtained. The subsystem that meets the heating requirement of the passenger compartment and has the highest energy efficiency is used to heat the passenger compartment, and the subsystem that meets the heating requirement of the battery and has the second highest energy efficiency is used to heat the battery. The subsystem that meets the heating requirement of the passenger compartment and has the second highest energy efficiency, and the subsystem that meets the heating requirement of the battery and has the second highest energy efficiency may be further simultaneously obtained, to determine whether the subsystem that meets the heating requirement of the passenger compartment and has the second highest energy efficiency is the same as the subsystem that meets the heating requirement of the battery and has the second highest energy efficiency. If the subsystem that meets the heating requirement of the passenger compartment and has the second highest energy efficiency is different from the subsystem that meets the heating requirement of the battery and has the second highest energy efficiency, respective corresponding subsystems are separately used to heat the passenger compartment and the battery. In other words, the subsystem that meets the heating requirement of the passenger compartment and has the second highest energy efficiency is used to heat the passenger compartment, and the subsystem that meets the heating requirement of the battery and has the second highest energy efficiency is used to heat the battery. If the subsystem that meets the heating requirement of the passenger compartment and has the second highest energy efficiency is the same as the subsystem that meets the heating requirement of the battery and has the second highest energy efficiency, it is determined whether the subsystem can simultaneously meet the heating requirement of the passenger compartment and the heating requirement of the battery. If the subsystem simultaneously meets the heating requirement of the passenger compartment and the heating requirement of the battery, the subsystem is controlled to perform heating.

Therefore, by implementing joint heating of the passenger compartment and the battery by using collaboration of appropriate subsystems or different subsystems, the heat requirement of the passenger compartment and the battery may be met, and proper distribution of the heat of the vehicle may be implemented, thereby improving the energy utilization efficiency.

In some embodiments, the control subsystem is further configured to obtain air return port information of the compressor in the heat pump subsystem, perform air supplement and enthalpy increase on the compressor according to the air return port information, and obtain the available heat value and the energy efficiency value of the heat pump subsystem after air supplement and enthalpy increase are performed, where the air return port information includes an air return pressure and/or an air return temperature of the air return port of the compressor.

Specifically, as shown in FIG. 1, the air return port information of the compressor 1 in the heat pump subsystem 100 is obtained through the control subsystem 500. The air return port information includes the air return pressure and/or the air return temperature of the air return port of the compressor 1. In other words, the air return port information obtained by the control subsystem 500 may be the air return pressure of the air return port, the air return temperature of the air return port, or the air return pressure and the air return temperature of the air return port.

It is determined whether air supplement and enthalpy increase need to be performed according to the obtained air return port information. When the air return pressure is insufficient, the air return temperature is too low, or the air return pressure is insufficient and the air return temperature is too low, it is determined, in this case, that a flow rate of a refrigerant flowing into the heat pump subsystem 100 is insufficient, and air supplement and enthalpy increase need to be performed on the compressor 1, to increase the flow rate of the refrigerant flowing into the air return port of the compressor 1, and further increase the flow rate of the refrigerant flowing into the heat pump subsystem 100, to improve a heating capacity of the heat pump subsystem 100, thereby resolving a problem of an insufficient heating capacity of the heat pump subsystem 100 when the air return pressure is insufficient. In addition, by performing air supplement and enthalpy increase, the compressor can do more work, reduce dependence on heat absorption of the air return port, improve the heating capacity of the heat pump subsystem in a state of a low temperature, and meet a use requirement of the heat pump subsystem at the low temperature, thereby resolving a problem that the compressor does less work in the state of the low temperature, and the heating capacity of the heat pump subsystem 100 is poor.

Further, for example, as shown in FIG. 2, the air return pressure of the air return port is obtained through the temperature and pressure sensor 2. When the obtained air return pressure is less than a preset first threshold of the air return pressure, that is, when a pressure of the air return port of the compressor 1 is low, the exhaust port of the compressor 1 may be controlled to be in communication with the air return port. When the exhaust port of the compressor 1 is in communication with the air return port, after being throttled and decompressed, a part of a high-temperature and high-pressure gaseous refrigerant compressed by the compressor 1 flows back into the air return port of the compressor 1 through the control valve 33, and is mixed with a gaseous refrigerant at the air return port of the compressor 1, thereby increasing a pressure and a flow rate of the gaseous refrigerant at the air return port of the compressor 1. When the air return pressure of the compressor is greater than or equal to a preset second threshold of the air return pressure, communication between the exhaust port of the compressor 1 and the air return port is disconnected, and air supplement and enthalpy increase performed on the compressor 1 is stopped. It should be noted that, the preset second threshold of the air return pressure is greater than or equal to the preset first threshold of the air return pressure. In other words, the preset second threshold of the air return pressure is equal to the preset first threshold of the air return pressure, or may be greater than the preset first threshold of the air return pressure to leave a certain margin. When the pressure of the air return port is low, as shown in FIG. 3, the exhaust port of the compressor 1 may be further controlled to be in communication with the gas-liquid separator 27 at the air return port. When the exhaust port of the compressor 1 is in communication with the gas-liquid separator 27 at the air return port, after being throttled and decompressed, a part of the high-temperature and high-pressure gaseous refrigerant flows into the gas-liquid separator 27, thereby increasing a temperature of a separated gaseous refrigerant in the gas-liquid separator 27. In addition, a liquid refrigerant in the gas-liquid separator 27 may be further heated to change a phase of the liquid refrigerant into the gaseous refrigerant, thereby increasing the pressure and the flow rate of the gaseous refrigerant flowing into the air return port of the compressor 1. When the air return pressure of the compressor is greater than or equal to the preset second threshold of the air return pressure, communication between the exhaust port of the compressor 1 and the gas-liquid separator 27 at the air return port is disconnected, and air supplement and enthalpy increase performed on the compressor 1 is stopped.

The air return temperature of the air return port is obtained through the temperature and pressure sensor 2. When the obtained air return temperature is less than a preset threshold of the air return temperature, that is, when the compressor 1 works in a low temperature environment and as a result, heat absorption of the air return port is insufficient, the pressure and the flow rate of the gaseous refrigerant at the air return port of the compressor 1 may also be increased by controlling the exhaust port of the compressor 1 to be in communication with the air return port or by controlling the exhaust port of the compressor 1 to be in communication with the gas-liquid separator 27 at the air return port. A specific controlling process is not described herein again. Therefore, the compressor can do more work in the state of the low temperature, to reduce dependence on heat absorption of the air return port, improve the heating capacity of the heat pump subsystem in the state of the low temperature, and meet a use requirement of the heat pump subsystem at the low temperature.

The air return pressure and the air return temperature of the air return port are simultaneously obtained through the temperature and pressure sensor 2. When the obtained air return pressure is less than the preset first threshold of the air return pressure and the obtained air return temperature is less than a preset threshold of the air return temperature, that is, when the pressure at the air return port of the compressor 1 is low and the compressor 1 works in the low temperature environment, the pressure and the flow rate of the gaseous refrigerant at the air return port of the compressor 1 may also be increased by controlling the exhaust port of the compressor 1 to be in communication with the air return port or by controlling the exhaust port of the compressor 1 to be in communication with the gas-liquid separator 27 at the air return port. A specific controlling process is not described herein again.

Therefore, by directly introducing the high-temperature and high-pressure refrigerant from the exhaust port of the compressor to the air return port of the compressor or indirectly introducing the refrigerant to the air return port of the compressor through the gas-liquid separator, a pressure and a flow rate of the refrigerant at an air suction port of the compressor may be increased, thereby improving a working capacity and a heating capacity of the heat pump subsystem. In addition, the air supplement and enthalpy increase involve only communication between the exhaust port of the compressor and the air return port, or communication between the exhaust port of the compressor and the gas-liquid separator at the air return port. A structure is simple, arrangement is easy, and a cost is low.

It should be noted that, after air supplement and enthalpy increase are performed on the heat pump subsystem, an available heat value and an energy efficiency value of the heat pump subsystem need to be re-obtained, and when the passenger compartment and/or the battery are heated, the heat pump subsystem after air supplement and enthalpy increase is used to participate in selection of a subsystem in collaboration with different subsystems, to determine an available heat value and an energy efficiency value of each latest subsystem and the latest different subsystems after collaboration, and select the appropriate subsystem and different subsystems after collaboration to heat the passenger compartment and the battery. In other words, when the passenger compartment has a heating requirement, available heat values and energy efficiency values of the heat pump subsystem after air supplement and enthalpy increase are performed, the air heating subsystem, the heat pump subsystem after air supplement and enthalpy increase are performed in collaboration with the high-pressure cooling subsystem, the heat pump subsystem after air supplement and enthalpy increase are performed in collaboration with the air heating subsystem or the heat pump subsystem after air supplement and enthalpy increase are performed in collaboration with the high-pressure cooling subsystem, and the air heating subsystem are obtained, to determine a subsystem that meets the heating requirement of the passenger compartment and has the highest energy efficiency to heat the passenger compartment. When the battery has a heating requirement, available heat values and energy efficiency values of the heat pump subsystem after air supplement and enthalpy increase are performed, the battery self-heating subsystem, the heat pump subsystem after air supplement and enthalpy increase are performed in collaboration with the high-pressure cooling subsystem, the heat pump subsystem after air supplement and enthalpy increase are performed in collaboration with the battery self-heating subsystem or the heat pump subsystem after air supplement and enthalpy increase are performed in collaboration with the high-pressure cooling subsystem, and the battery self-heating subsystem are obtained, to determine a subsystem that meets the heating requirement of the passenger compartment and has the highest energy efficiency to heat the battery.

Figure 4:
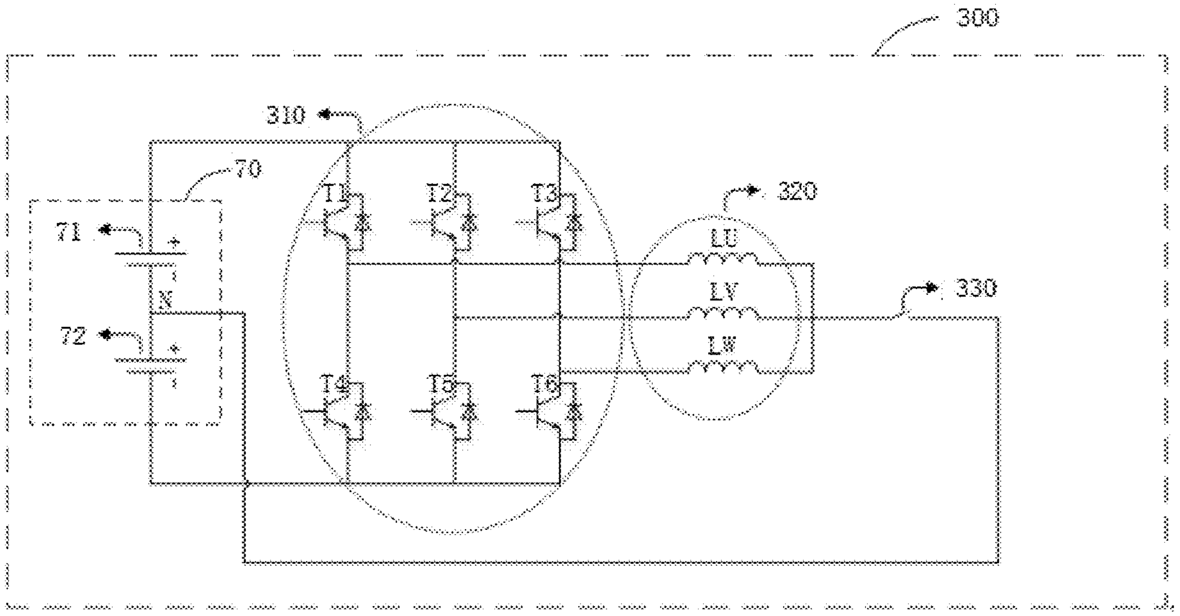
FIG. 4 is a schematic diagram of a structure of a battery self-heating subsystem according to an embodiment of the present disclosure.

In some embodiments, as shown in FIG. 4, the battery self-heating subsystem 300 includes: a battery 70, the battery 70 including a first battery pack 71 and a second battery pack 72, a negative electrode of the first battery pack 71 being connected to a positive electrode of the second battery pack 72, and a connection point being a first node N; an inverter circuit 310, a positive direct current terminal of the inverter circuit 310 being connected to a positive electrode of the first battery pack 71, and a negative direct current terminal of the inverter circuit 310 being connected to a negative electrode of the second battery pack 72; a drive motor 320, a three-phase winding of the drive motor 320 being correspondingly connected to a three-phase alternating current terminal of the inverter circuit 310, and a neutral point of the three-phase winding being connected to the first node N through a controllable switch 330; and the control subsystem 500, being further configured to: when determining to perform heating by using the battery self-heating subsystem 300, control the controllable switch 330 to be in a turn-on state, and perform on/off control on the inverter circuit 310, to perform alternate oscillation heating on the first battery pack 71 and the second battery pack 72 through the three-phase winding.

Further, the control subsystem 500 is specifically configured to first control an upper tube of each bridge arm in the inverter circuit 310 to be in a turn-on state and a lower tube of each bridge arm in the inverter circuit 310 to be in a turn-off state, to enable the first battery pack 71 to charge the three-phase winding, then control the upper tube and the lower tube of each bridge arm in the inverter circuit 310 to be in the turn-off state, to enable the three-phase winding to charge the second battery pack 72, then control the lower tube of each bridge arm in the inverter circuit 310 to be in the turn-on state and the upper tube of each bridge arm in the inverter circuit 310 to be in the turn-off state, to enable the second battery pack 72 to charge the three-phase winding, and then control the upper tube and the lower tube of each bridge arm in the inverter circuit 4 to be in the turn-off state, to enable the three-phase winding to charge the first battery pack 71, which are cyclically performed, to perform alternate oscillation heating.

Figure 5:
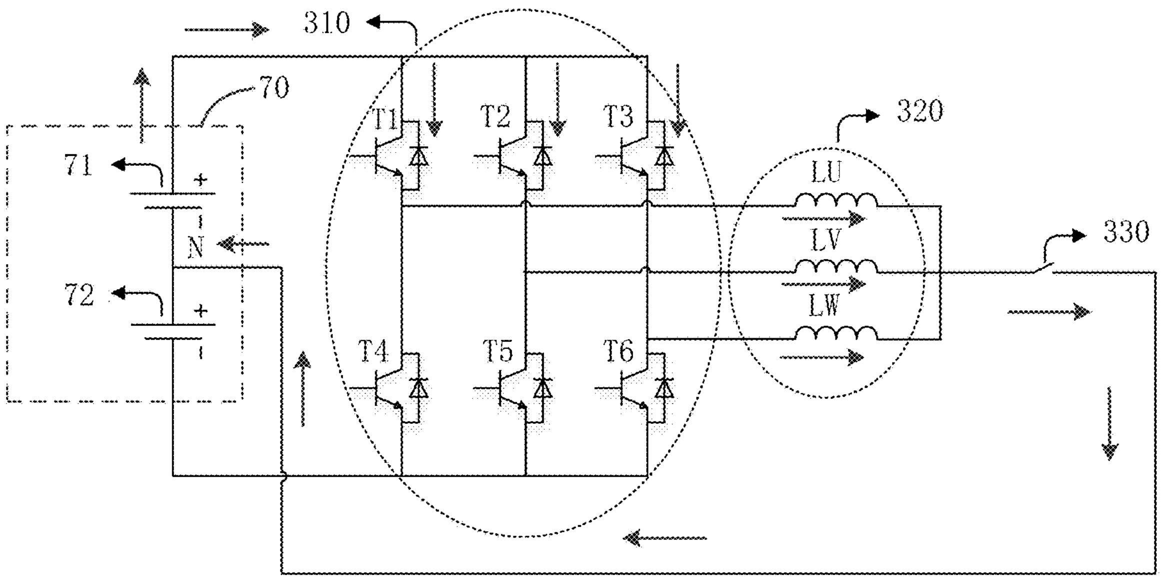
FIG. 5 is a schematic diagram of a flow direction of a current of a battery self-heating subsystem according to an embodiment of the present disclosure.

Specifically, when the battery self-heating subsystem 300 is used to heat the battery, the control subsystem 500 controls the controllable switch 330 to be in the turn-on state, and when the upper tube of each bridge arm in the inverter circuit 310 is controlled to be in the turn-on state and the lower tube of each bridge arm in the inverter circuit 310 is controlled to be in the turn-off state, that is, when T1, T2, and T3 are in the turn-on state and T4, T5, and T6 are in the turn-off state, as shown in FIG. 5, a current flows from the positive electrode of the first battery pack 71, flows through T1, T2, and T3, and then charges three-phase windings LU, LV, and LW of the drive motor 320, and the charged current returns to the negative electrode of the first battery pack 71 through the controllable switch 330. At this stage, the first battery pack 71 discharges and charges the three-phase windings LU, LV, and LW of the drive motor 320.

Figure 6:
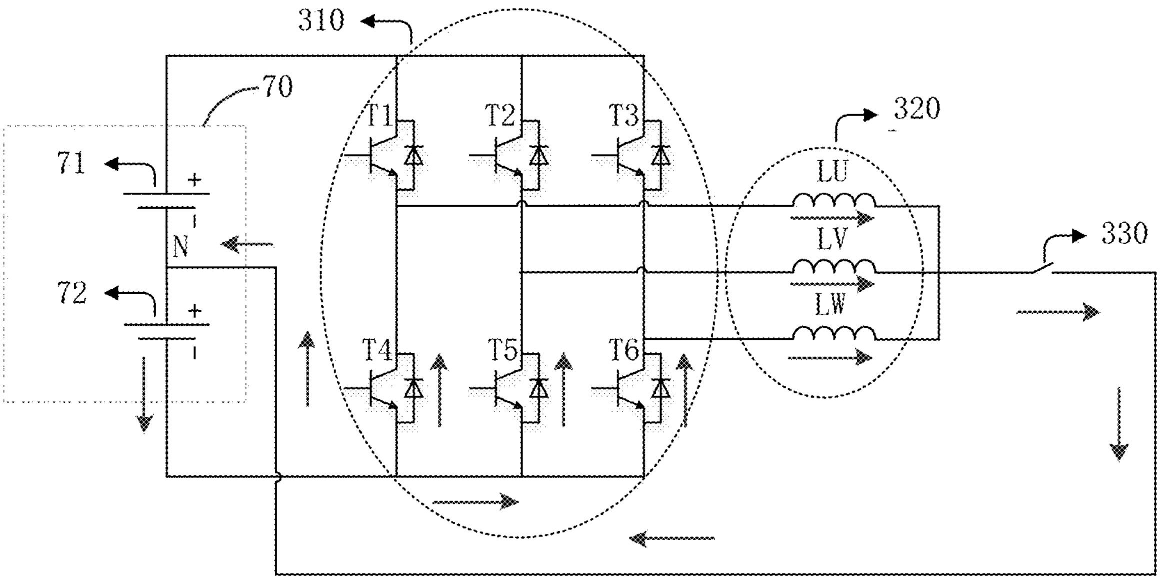
FIG. 6 is a schematic diagram of a flow direction of a current of a battery self-heating subsystem according to an embodiment of the present disclosure.

When the upper tube and the lower tube of each bridge arm in the inverter circuit 310 are controlled to be in the turn-off state, that is, when T1, T2, and T3 are in the turn-off state, and T4, T5, and T6 are also in the turn-off state, as shown in FIG. 6, a current flows from the three-phase windings LU, LV, and LW of the drive motor 320 through the controllable switch 330 into the positive electrode of the second battery pack 72, to charge the second battery pack 72, and the charged current flows through diodes of T4, T5, and T6, and returns to an other end of each of the three-phase windings LU, LV, and LW of the drive motor 320. At this stage, the three-phase windings LU, LV, and LW of the drive motor 320 discharge, and charge the second battery pack 72.

Figure 7:
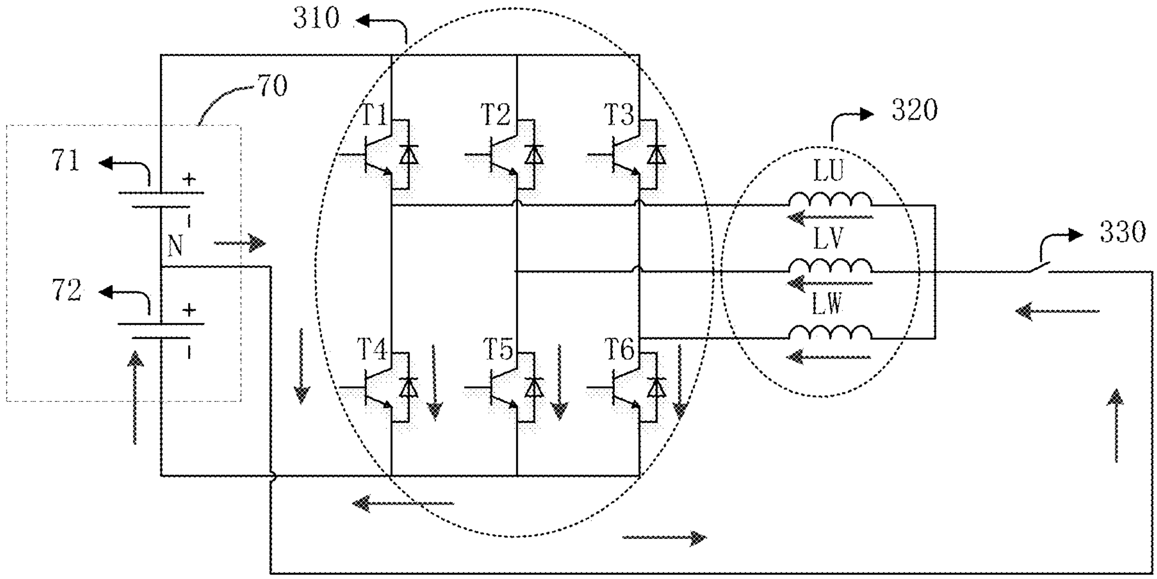
FIG. 7 is a schematic diagram of a flow direction of a current of a battery self-heating subsystem according to an embodiment of the present disclosure.

When the lower tube of each bridge arm in the inverter circuit 310 is controlled to be in the turn-on state and the upper tube of each bridge arm in the inverter circuit 310 is controlled to be in the turn-off state, that is, when T1, T2, and T3 are in the turn-off state and T4, T5, and T6 are in the turn-on state, as shown in FIG. 7, a current flows from the positive electrode of the second battery pack 72 through the controllable switch 330, and then charges the three-phase windings LU, LV, and LW of the drive motor 320, and the charged current returns to the negative electrode of the second battery pack 72 through T1, T2, and T3. At this stage, the second battery pack 72 discharges and charges the three-phase windings LU, LV, and LW of the drive motor 320.

Figure 8:
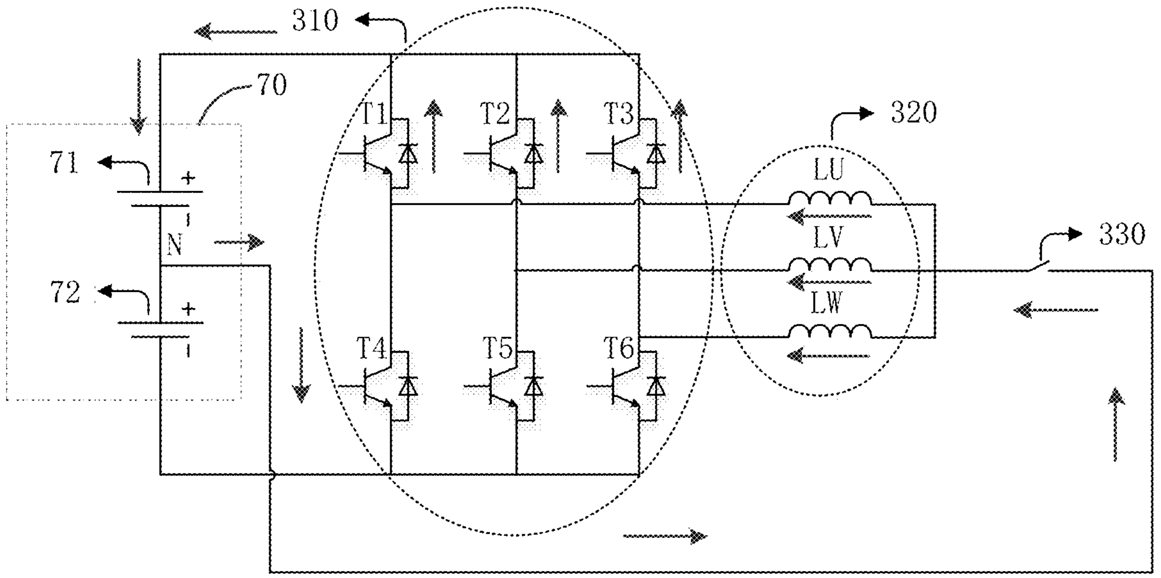
FIG. 8 is a schematic diagram of a flow direction of a current of a battery self-heating subsystem according to an embodiment of the present disclosure.

When the upper tube and the lower tube of each bridge arm in the inverter circuit 4 are controlled to be in the turn-off state, that is, when T1, T2, and T3 are in the turn-off state, and T4, T5, and T6 are also in the turn-off state, as shown in FIG. 8, a current flows from the three-phase windings LU, LV, and LW of the drive motor 320, flows through diodes of T4, T5, and T6, and flows into the positive electrode of the first battery pack 71, to charge the first battery pack 71, and the charged current returns to an other end of each of the three-phase windings LU, LV, and LW of the drive motor 320 through the controllable switch 330. At this stage, the three-phase windings LU, LV, and LW of the drive motor 320 discharge, and charge the first battery pack 71.

Therefore, charging and discharging of the first battery pack and the second battery pack in different time periods may be implemented through the battery self-heating subsystem, to ensure that only one battery pack charges or discharges at a same moment. In this way, a heating circuit that oscillates in a staggering manner may be formed, and a battery ripple may be reduced. A midpoint lead wire is set at each of the first battery pack and the second battery pack, which may provide a circulation loop for an oscillation current when the three-phase windings of the drive motor pass through a same direction current. In addition, a staggered oscillation heating power that is provided may reach three times that of a battery without a midpoint lead wire, which improves a temperature rising rate of battery heating. A newly added midpoint lead wire does not affect normal driving of the vehicle, and self-heating of the battery may be implemented by reusing components such as a drive motor, to reduce a cost of the battery self-heating subsystem.

In some embodiments, the control subsystem is further configured to obtain a corresponding required cooling capacity value when the passenger compartment has a cooling requirement, and control, according to the required cooling capacity value, the heat pump subsystem to perform cooling.

Specifically, as shown in FIG. 2 and FIG. 3, when the passenger compartment 60 has a cooling requirement, a required cooling capacity value corresponding to the passenger compartment 60 is first obtained, and a flow rate of the refrigerant output by the compressor 1 in the heat pump subsystem is adjusted according to the required cooling capacity value. The refrigerant is driven to flow into the vehicle exterior condenser 7 through the solenoid valve 6 for heat dissipation. The refrigerant after heat dissipation is throttled and decompressed by the electronic expansion valve 32, and flows into the evaporator 31. After absorbing heat and evaporating in the evaporator 31, the refrigerant returns to the compressor 1 through the gas-liquid separator 27, thereby implementing heat exchange between the passenger compartment 60 and the evaporator 31, and achieving a purpose of cooling the passenger compartment 60 in the vehicle.

In some embodiments, the control subsystem is further configured to obtain the corresponding required cooling capacity value when the battery has a cooling requirement, and control, according to the required cooling capacity value, the heat pump subsystem to perform heat exchange on the battery, which specifically may be that the heat pump subsystem cools the battery.

Specifically, still referring to FIG. 2 and FIG. 3, when the battery 70 has a cooling requirement, a required cooling capacity value corresponding to the battery 70 is first obtained, and a flow rate of the refrigerant output by the compressor 1 in the heat pump subsystem is adjusted according to the required cooling capacity value. The refrigerant is driven to flow into the vehicle exterior condenser 7 through the solenoid valve 6 for heat dissipation. The refrigerant after heat dissipation is throttled and decompressed by the electronic expansion valve 19, and flows into the battery pack cold plate 21. After absorbing heat and evaporating in the battery pack cold plate 21, the refrigerant returns to the compressor 1 through the gas-liquid separator 27 after being throttled and through pressure regulation by the throttle valve 23, thereby implementing cooling of the battery 70.

In some embodiments, the control subsystem is further configured to: when the high-pressure system has a heat dissipation requirement, if determining that the heat pump subsystem has no heat exchange requirement, for example, when the heat pump subsystem does not need to perform heat replenishment, control to turn off heat exchange between the high-pressure cooling subsystem and the heat pump subsystem, and control the high-pressure cooling subsystem to perform air heat dissipation on the high-pressure system; and if determining that the heat pump subsystem has a heat exchange requirement, for example, when the heat pump subsystem needs to perform heat replenishment, control the high-pressure cooling subsystem to perform heat exchange on the heat pump subsystem, which specifically may be controlling the high-pressure cooling subsystem to perform heat replenishment on the heat pump subsystem, to perform heat dissipation on the high-pressure system.

Specifically, still referring to FIG. 2 and FIG. 3, when components such as the motor in the high-pressure system 11 generate too much heat, and have a heat dissipation requirement, if the heat pump subsystem does not have a heat replenishment requirement, an AC circuit of a three-way valve is controlled to be turned on, and a BC circuit of the three-way valve is controlled to be turned off. By driving a water pump 12 in the high-pressure cooling subsystem, a high-temperature coolant flowing out of the high-pressure system 11 after cooling is input into a motor radiator 8, and an electronic fan 9 works, to cool the coolant in the motor radiator 8, and directly dissipate heat to the air to cool the high-pressure system 11. If the heat pump subsystem has a heat replenishment requirement, the BC circuit of the three-way valve is controlled to be turned on, and the AC circuit of the three-way valve is controlled to be turned off. By driving the water pump 12 in the high-pressure cooling subsystem, the high-temperature coolant flowing out of the high-pressure system 11 after cooling is transferred to a plate heat exchanger 15. In this way, the high temperature system 11 can be cooled down, and heat replenishment on the heat pump subsystem can be implemented, thereby improving the energy utilization efficiency of the vehicle.

In summary, according to the integrated heat management system in the embodiment of the present disclosure, the heat pump subsystem exchanges heat with the passenger compartment and the battery of the vehicle, the high-pressure cooling subsystem exchanges heat with the high-pressure system of the vehicle and the heat pump subsystem, the battery self-heating subsystem heats the battery through charging and discharging, the air heating subsystem exchanges heat with the passenger compartment, and the control subsystem controls the control valve in the heat pump subsystem to be in communication with the exhaust port of the compressor and the air return port of the compressor, to implement air supplement and enthalpy increase on the compressor. Therefore, the system may not only meet the heat requirement of the passenger compartment and the battery, but also implement proper distribution of heat between the passenger compartment and the battery, and by performing air supplement and enthalpy increase on the compressor, may further improve the heating capacity of the heat pump subsystem, thereby improving the energy utilization efficiency of the vehicle.

Figure 9:
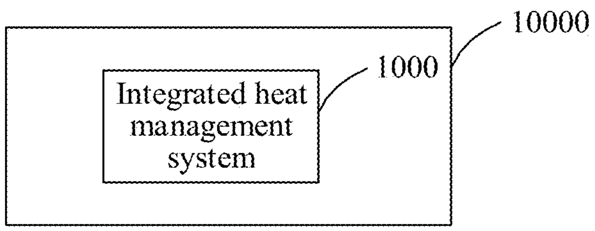
FIG. 9 is a schematic diagram of a structure of a vehicle according to an embodiment of the present disclosure.

FIG. 9 is a schematic diagram of a structure of a vehicle according to an embodiment of the present disclosure. Referring to FIG. 9, the vehicle 10000 includes the integrated heat management system 1000.

According to the vehicle in the embodiment of the present disclosure, the foregoing integrated heat management system may not only meet the heat requirement of the passenger compartment and the battery, but also implement proper distribution of heat between the passenger compartment and the battery, and by performing air supplement and enthalpy increase on the compressor, may further improve the heating capacity of the heat pump subsystem, thereby improving the energy utilization efficiency of the vehicle.

In the description of this specification, the description of the reference terms "an embodiment", "some embodiments", "an example", "a specific example", "some examples", and the like means that specific features, structures, materials or characteristics described in combination with the embodiment(s) or example(s) are included in at least one embodiment or example of the present disclosure. In this specification, schematic descriptions of the foregoing terms do not necessarily point at a same embodiment or example. In addition, the described specific features, structures, materials, or characteristics may be combined in a proper manner in any one or more of the embodiments or examples.

In addition, the terms "first" and "second" are used merely for the purpose of description, and shall not be construed as indicating or implying relative importance or implying a quantity of indicated technical features. Therefore, features defining "first" and "second" can explicitly or implicitly include at least one of the features. In the descriptions of the present disclosure, unless explicitly specified, "multiple" means at least two, for example, two or three.

In the present disclosure, it should be noted that unless otherwise clearly specified and limited, the terms "mounted", "connected", "connection", and "fixed" should be understood in a broad sense. For example, a connection may be a fixed connection, a detachable connection, or an integral connection; may be a mechanical connection or an electrical connection; may be a direct connection or an indirect connection by means of an intermediate medium; or may be internal communication between two elements or interaction relationship between two elements, unless otherwise clearly limited. A person of ordinary skill in the art can understand specific meanings of the terms in the present disclosure based on specific situations.

Although embodiments of the present disclosure have been shown and described above, it can be understood that, the foregoing embodiments are examples and should not be understood as limitation to the present disclosure. A person of ordinary skill in the art can make changes, modifications, replacements, or variations to the foregoing embodiments within the scope of the present disclosure.

What is claimed is:

1. An integrated heat management system, comprising:

a heat pump subsystem, configured to heat or cool a passenger compartment of a vehicle, and configured to exchange heat with a battery of the vehicle;

a high-pressure cooling subsystem, configured to exchange heat with a high-pressure system of the vehicle and the heat pump subsystem;

a battery self-heating subsystem, configured to heat the battery through charging and discharging of the battery;

an air heating subsystem, configured to heat the passenger compartment; and the heat pump subsystem comprising a compressor and a control valve, one end of the control valve being in communication with an exhaust port of the compressor, and another end of the control valve being in communication with an air return port of the compressor or being in communication with the air return port of the compressor through a gas-liquid separator, wherein the control valve is controlled to be in communication with the exhaust port of the compressor and the air return port of the compressor, to implement air supplement and enthalpy increase.

2. The integrated heat management system according to claim 1, wherein: in response to either of the passenger compartment or the battery has a heating requirement, a corresponding required heat value is obtained, an available heat value and an energy efficiency value of each subsystem of the heat pump subsystem, the high-pressure cooling subsystem, the battery self-heating subsystem, and the air heating subsystem are obtained, the required heat value with the available heat value of the each subsystem are compared, and a subsystem is selected from the heat pump subsystem, the high-pressure cooling subsystem, the battery self-heating subsystem, and the air heating subsystem that meets the required heat value and has highest energy efficiency to heat the passenger compartment or the battery that has the heating requirement.

3. The integrated heat management system according to claim 1, wherein in response to the passenger compartment has a heating requirement, an available heat value and an energy efficiency value of each of the heat pump subsystem, the high-pressure cooling subsystem, and the air heating subsystem are obtained, a total available heat value and an energy efficiency value after collaboration of the each subsystem are obtained, a required heat value of the passenger compartment is obtained, and, from the heat pump subsystem, the high-pressure cooling subsystem, and the air heating subsystem after collaboration, a subsystem that meets the heating requirement of the passenger compartment and has the highest energy efficiency to heat the passenger compartment is selected.

4. The integrated heat management system according to claim 1, wherein in response to the battery has a heating requirement, an available heat value and an energy efficiency value of each subsystem of the heat pump subsystem, the high-pressure cooling subsystem, and the battery self-heating subsystem are obtained, an available heat value and an energy efficiency value after collaboration of the each subsystem are obtained, a required heat value of the battery is obtained, and, from the heat pump subsystem, the high-pressure cooling subsystem, and the battery self-heating subsystem after collaboration, a subsystem that meets the heating requirement of the battery and has the highest energy efficiency to heat the battery is selected.

5. The integrated heat management system according to claim 1, wherein in response to both the passenger compartment and the battery have a heating requirement, an available heat value and an energy efficiency value of each of the heat pump subsystem, the high-pressure cooling subsystem, and the air heating subsystem are obtained, the available heat value and the energy efficiency value after collaboration of different subsystems are obtained, the required heat value of the passenger compartment is obtained, and, from the heat pump subsystem, the high-pressure cooling subsystem, and the battery self-heating subsystem after collaboration, the subsystem that meets the heating requirement of the passenger compartment and has the highest energy efficiency to heat the passenger compartment is selected;

the available heat value and the energy efficiency value of each subsystem of the heat pump subsystem, the high-pressure cooling subsystem, and the battery self-heating subsystem are obtained, the available heat value and the energy efficiency value after collaboration of the each subsystem are obtained, the required heat value of the battery is obtained, and, from the heat pump subsystem, the high-pressure cooling subsystem, and the battery self-heating subsystem after collaboration, the subsystem that meets the heating requirement of the battery and has the highest energy efficiency to heat the battery is selected;

in response to a selected subsystem that meets the heating requirement of the passenger compartment and has the highest energy efficiency is the same as a selected subsystem that meets the heating requirement of the battery and has the highest energy efficiency, in response to the selected subsystem simultaneously meets the heating requirement of the passenger compartment and the heating requirement of the battery, the selected subsystem is controlled to perform heating; and in response to the selected subsystem does not simultaneously meet the heating requirement of the passenger compartment and the heating requirement of the battery, a subsystem that meets the heating requirement of the passenger compartment and has second highest energy efficiency and a subsystem that meets the heating requirement of the battery and has the second highest energy efficiency is selected to perform heating, or one of a subsystem that meets the heating requirement of the passenger compartment and has second highest energy efficiency and a subsystem that meets the heating requirement of the battery and has the second highest energy efficiency is selected to perform heating.

6. The integrated heat management system according to claim 1, wherein air return port information of the compressor in the heat pump subsystem is obtained, and air supplement and enthalpy increase on the compressor is performed according to the air return port information, and an available heat value and an energy efficiency value of the heat pump subsystem after air supplement and enthalpy increase are performed are obtained, wherein the air return port information comprises at least one of an air return pressure and an air return temperature of the air return port of the compressor.

7. The integrated heat management system according to claim 1, wherein a corresponding required cooling capacity value is obtained in response to the passenger compartment has a cooling requirement, and, according to the required cooling capacity value, the heat pump subsystem is controlled to cool the passenger compartment.

8. The integrated heat management system according to claim 1, wherein the corresponding required cooling capacity value is obtained in response to the battery has a cooling requirement, and, according to the required cooling capacity value, the heat pump subsystem is controlled to perform heat exchange on the battery.

9. A vehicle, comprising the integrated heat management system according to claim 1.

10. An integrated heat management system, comprising:

a heat pump subsystem, configured to heat or cool a passenger compartment of a vehicle, and configured to exchange heat with a battery of the vehicle;

a high-pressure cooling subsystem, configured to exchange heat with a high-pressure system of the vehicle and the heat pump subsystem;

a battery self-heating subsystem, configured to heat the battery through charging and discharging of the battery;

an air heating subsystem, configured to heat the passenger compartment; and the heat pump subsystem comprising a compressor and a control valve, one end of the control valve being in communication with an exhaust port of the compressor, and another end of the control valve being in communication with an air return port of the compressor or being in communication with the air return port of the compressor through a gas-liquid separator, wherein the control valve is controlled to be in communication with the exhaust port of the compressor and the air return port of the compressor, to implement air supplement and enthalpy increase, wherein the battery self-heating subsystem comprises:

a battery, the battery comprising a first battery pack and a second battery pack, a negative electrode of the first battery pack being connected to a positive electrode of the second battery pack at a connection point, the connection point being a first node;

an inverter circuit, a positive direct current terminal of the inverter circuit being connected to a positive electrode of the first battery pack, and a negative direct current terminal of the inverter circuit being connected to a negative electrode of the second battery pack; and a drive motor, a three-phase winding of the drive motor being correspondingly connected to a three-phase alternating current terminal of the inverter circuit, and a neutral point of the three-phase winding being connected to the first node through a controllable switch, wherein: in response to determining to heat the battery by using the battery self-heating subsystem, the controllable switch is controlled to be in a turn-on state, and on/off control on the inverter circuit is performed, to perform alternate oscillation heating on the first battery pack and the second battery pack through the three-phase winding.

11. The integrated heat management system according to claim 10, wherein cyclically:

an upper tube of each bridge arm in the inverter circuit is controlled first to be in the turn-on state and a lower tube of the each bridge arm in the inverter circuit is controlled to be in a turn-off state, to enable the first battery pack to charge the three-phase winding, the upper tube and the lower tube of the each bridge arm in the inverter circuit is controlled to be in the turn-off state, to enable the three-phase winding to charge the second battery pack, the lower tube of each bridge arm in the inverter circuit is controlled to be in the turn-on state and the upper tube of the bridge arm in the inverter circuit is controlled to be in the turn-off state, to enable the second battery pack to charge the three-phase winding, and the upper tube and the lower tube of the bridge arm in the inverter circuit are controlled to be in the turn-off state, to enable the three-phase winding to charge the first battery pack, to perform alternate oscillation heating.

12. An integrated heat management system, comprising:

a heat pump subsystem, configured to heat or cool a passenger compartment of a vehicle, and configured to exchange heat with a battery of the vehicle;

a high-pressure cooling subsystem, configured to exchange heat with a high-pressure system of the vehicle and the heat pump subsystem;

a battery self-heating subsystem, configured to heat the battery through charging and discharging of the battery;

an air heating subsystem, configured to heat the passenger compartment; and the heat pump subsystem comprising a compressor and a control valve, one end of the control valve being in communication with an exhaust port of the compressor, and another end of the control valve being in communication with an air return port of the compressor or being in communication with the air return port of the compressor through a gas-liquid separator, wherein the control valve is controlled to be in communication with the exhaust port of the compressor and the air return port of the compressor, to implement air supplement and enthalpy increase, wherein: in response to the high-pressure system has a heat dissipation requirement, in response to that the heat pump subsystem has no heat exchange requirement, heat exchange between the high-pressure cooling subsystem and the heat pump subsystem is turned off, and the high-pressure cooling subsystem is controlled to perform air heat dissipation on the high-pressure system; in response to the heat pump subsystem has a heat exchange requirement, the high-pressure cooling subsystem is controlled to perform heat exchange on the heat pump subsystem, to perform heat dissipation on the high-pressure system.

* * * * *